United States Patent Office 3,313,833
Patented Apr. 11, 1967

3,313,833
PROCESS FOR 5α-ANDROSTANE 1α,17β-DIOL-3-ONE
Rudolf Wiechert and Friedmund Neumann, Berlin, Germany, assignors to Schering Aktiengesellschaft, Berlin, Germany
No Drawing. Filed Jan. 29, 1965, Ser. No. 429,109
Claims priority, application Germany, Mar. 19, 1964, Sch 34,827
6 Claims. (Cl. 260—397.4)

The present invention relates to a new anabolic compound, to anabolic compositions thereof, particularly oral anabolic compositions, and to the use of the same whereby an anabolic effect is achieved by oral treatment.

Prior to the present invention, with the exception of 1-methyl-Δ¹-5α-androstene-17β-ol-3-one, all orally administerable anabolic compounds possessed a 17α-alkyl group, particularly the 17α-methyl group. This 17α-alkyl group is considered to be responsible for the undesired side effects of the anabolics, such as the simultaneous occurrence of a marked androgenic activity or the causing of liver damage.

However, the presence of the 17α-position-alkyl group was always considered to be essential in order to obtain oral anabolic activity. Thus, for example, testosterone is generally used intratmuscularly or subcutaneously and can only be administered orally by buccal absorption. 17α-methyl testosterone, on the other hand, can be administered orally, and upon oral administration is more active than testosterone.

However, 17α-methyl testosterone is not a very suitable anabolic agent because of its strong androgenicity. Consequently, a constant search has been going on to find orally administerable anabolic agents which are strong and effective, and which are not alkylated in 17α-position, and particularly to find such anabolic agents which have the lowest possible androgenic side effect.

It is accordingly a primary object of the present invention to provide a new anabolic agent which can be administered oraly, and which upon oral administration has a high degree of activity with a very low degree of undesired side effects.

It is another object of the present invention to provide a new anabolic agent which does not contain a 17α-alkyl group, so that the same has a low degree of undesired side effects, and which nevertheless can be administered orally to achieve a high degree of effectiveness as an anabolic agent.

It is yet another object of the present invention to provide for the oral administration of the anabolic agent of the present invention to achieve a high anabolic effect with low undesired side effects.

Other objects and advantages of the present invention will be apparent from a further reading of the specification and of the appended claims.

With the above and other objects in view, the present invention mainly comprises the new anabolic compound 5α-androstane-1α,17β-diol-3-one.

This compound possesses all of the above mentioned desiderata of oral anabolic compounds, namely a high degree of effectiveness upon peroral administration and a minimum of undesired side effects.

Table I below sets forth the values of comparisons on infantile rats upon peroral administration of 5α-androstane-1α,17β-diol-3-one, on the one hand, and various known anabolic agents under the same conditions, on the other hand.

TABLE I

| Substance | Doses p.o. (mg./animal/day/12 times) | Levator ani weight (mg.) | Seminal vesicle weight (mg.) |
|---|---|---|---|
| 17α-methyl-testosterone | 10 | 32 | 240 |
|  | 30 | 44 | 371 |
| 4-hydroxy-17α-methyl-testosterone | 10 | 44 | 188 |
| 17α-methyl-5α-androstane-17β-ol-(3,2-c)-pyrazole | 10 | 48 | 142 |
| 5α-androstane-1α,17β-diol-3-one | 10 | 43 | 76 |

The above comparison shows that the activity of the 5α-androstane-1α,17β-diol-3-one, measured with respect to the levator ani weight, is about three times as strong as is 17α-methyl-testosterone, and, measured with respect to the seminal vesicle weight, it exhibits only a very slight androgenic activity as compared to the 17α-alkylated anabolic.

In addition to the anabolic action, the compound of the present invention has been found to exhibit an extremely good ovulation inhibiting action. In the ovulation inhibiting test on virgin female rats, only 1 mg. of 5α-androstane-1α,17β-diol-3-one upon peroral administration was necessary to obtain an inhibition of 50% of the animals, while under the same conditions, in the case of the known and clinically used 17α-ethinyl-19-nor-testosterone, 3 mg. was necessary to achieve the same effect.

The compound of the present invention may be administered in all of the common administration forms, such as tablets, dragees, capsules, suspensions and solvents, in which the compound is made into the form of a composition with a suitable carrier or solvent, particularly one for oral administration. Among the most suitable carriers are milk sugar, talcum, corn starch and magnesium stearate for tablets, dragees and hard capsules; sesame oil, castor oil or α-phenylpropanol for soft capsules; molasses for suspensions and alcohols for solution.

The compositions of the 5α-androstane-1α,17β-diol-3-one and a carrier or carriers therefor may be administered in varying amounts of from about 0.5–40 mg. per day per person, and most preferably about 5 mg.–25 mg. per day per person.

The compositions of the active ingredient of the present invention may be used for all indications for which known anabolics have been used, for example in the treatment of consumptive diseases, for the treatment of generally run down conditions, for cachectic conditions, to promote convalescence, in the treatment of osteoporosis, chronic liver disorders, etc. The great advantage of the present invention is the possibility of oral administration with high degree of anabolic effect and minimum degree of undesired side effects.

The fact that the free 5α-androstane-1α,17β-diol-3-one, in contrast to its 17-esters (note German Patent No. 1,152,103 and German Patent No. 1,154,467), has been unknown is due to the surprisingly considerable difficulties in the making of this free alcohol. Thus, for example, the saponification of the ester group of the mentioned 17-ester proceeds very smoothly, either in acid medium or alkaline medium, however, always restricted to a simultaneous splitting off of the 1α-position hydroxyl group.

It is also not possible, in analogous utilization of the process of German Patent No. 1,154,467, to produce the desired free alcohol by adding on to the 17-position unesterified Δ¹-5α-androstene-17β-ol-3-one of a lower halogenated acid, followed by reductive elimination of the thus introduced 2-position halogen, since the free 17-position hydroxyl group is directly oxidized into the 17-keto group by the addition on of the lower halogenated acid.

It has now been found that it is possible to produce the desired free 5α-androstane-1α,17β-diol-3-one, starting from its 17-esters, if, during the ester saponification in alkaline medium the 3-keto group is intermediately protected by ketalizing. The reaction proceeds in accordance with the following reaction mechanism:

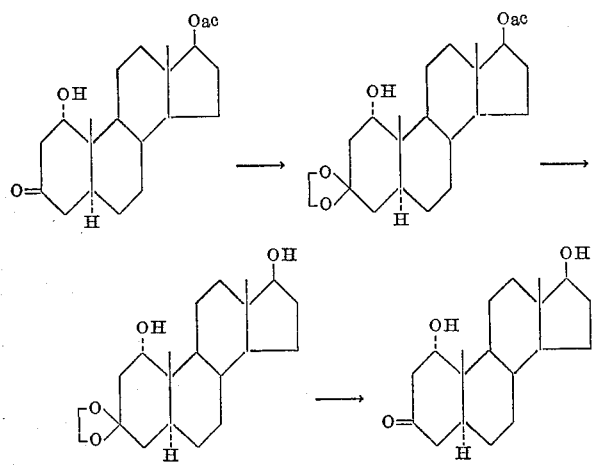

The ketalizing by means of glycol is preferably carried out in a non-polar, water-free organic solvent, preferably benzene, in the presence of a trace of toluene sulfonic acid. The ketal splitting proceeds under very mild acid conditions.

A further method of producing the desired 5α-androstane-1α,17β-diol-3-one has been found by reductive splitting of the epoxide ring of 1,2α-epoxy-5α-androstane-17β-ol-3-one.

Inasmuch as the splitting of the epoxide ring is carried out by means of lithium-aluminum hydride, it is necessary to again protect the 3-keto group by intermediate ketalization. The reaction proceeds in accordance with the following mechanism:

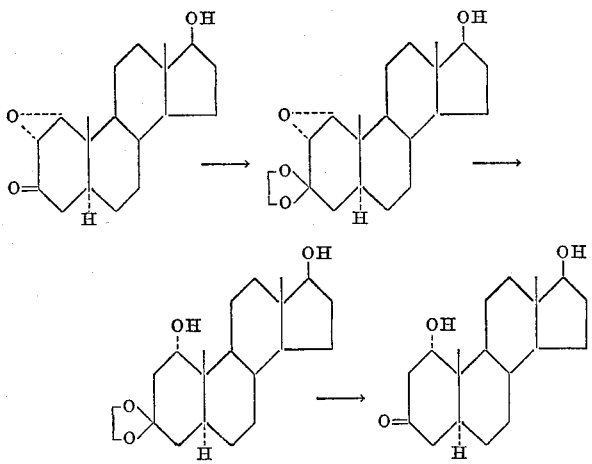

The protection of the keto group is unnecessary if the splitting of the epoxide ring is carried out by means of lithium in ethylamine, instead of by means of lithium-aluminum hydride. The yields in this case are somewhat lower.

The following examples are given to further illustrate the present invention. The scope of the invention is not, however, meant to be limited to the specific details of the examples:

Example 1

15 g. of 5α - androstane-1α,17α-diol-3-one-17-acetate (produced according to the method of German Patent No. 1,152,103 or German Patent No. 1,154,467), 750 cc. of absolute benzene, 45 cc. of distilled ethylene glycol and 379 mg. of p-toluene sulfonic acid are heated for 7 hours under stirring and under a nitrogen stream to reflux, with a water separator. The reaction mixture is then diluted with benzene, the organic phase is washed with water until neutral and dried over sodium sulfate. The residue which remains after evaporation under vacuum is recrystallized from methanol. There is thus obtained 11.1 g. of 3,3-ethylenedioxy-5α-androstane-1α,17β-diol-17-acetate which melts at 158.5–161° C.

10 g. of 3,3-ethylenedioxy-5α-androstane-1α,17β-diol-17-acetate, 10 g. of water-free potassium carbonate, 200 cc. of methanol and 20 cc. of water are heated under stirring and under nitrogen stream to reflux for 1½ hours. The reaction mixture is then stirred into ice water, extracted with methylene chloride, the organic phase is washed with water until neutral and dried over sodium sulfate. The residue which remains after evaporation under vacuum is recrystallized from ethyl acetate, and there is thus obtained 7.8 g. of 3,3-ethylenedioxy-5α-androstane-1α,17β-diol which melts at 247.5–252° C.

3.55 g. of 3,3 - ethylenedioxy-5α-androstane-1α,17β-diol, 355 mg. of p-toluene sulfonic acid, 710 cc. of acetone and 107 cc. of water are heated under refluxing for 60 minutes and permitted to stand for an additional 60 minutes at room temperature. The reaction mixture is subsequently concentrated under vacuum to about ⅓ of the original volume, then stirred into ice water, extracted with chloroform, the organic phase is washed with water until neutral and dried over sodium sulfate. The residue which remains after evaporation under vacuum is recrystallized from ethyl acetate. There is thus obtained 3.1 g. of 5α-androstane-1α,17β-diol-3-one having a melting point (with decomposition) of 238–240° C.

Example 2

8 g. of 1,2α-epoxy-5α-androstane-17β-ol-3-one (produced according to J. Org. Chem. 27, 2205 [1962]), 400 cc. of absolute benzene, 20 cc. of distilled ethylene glycol and 200 mg. of p-toluene sulfonic acid are heated for 6 hours under stirring and in a nitrogen stream to refluxing with a water separator. The reaction mixture is then diluted with benzene, the organic phase is washed with water until neutral and dried over sodium sulfate. After evaporation under vacuum there is thus obtained 8.4 g. of 1,2α - epoxy-3,3-ethylenedioxy-5α-androstane-17β-ol as a crude product.

2.51 g. of lithium-aluminum hydride, slurried in 200 cc. of absolute ether, are added dropwise to 8.4 g. of 1,2α - epoxy - 3,3 - ethylenedioxy - 5α-androstane-17β-ol, dissolved in 840 cc. of absolute ether, and the reaction mixture is heated under refluxing for 3 hours while stirring. The reaction mixture is then carefully stirred into ice water, acidified with dilute sulfuric acid and extracted with ether. The etheral phase is washed with water until neutral and dried over sodium sulfate. The residue which remains after evaporation under vacuum is recrystallized from ethyl acetate, and there is thus obtained 5.3 g. of 3,3 - ethylenedioxy - 5α - androstane-1α,17α-diol which melts at 247–251° C.

5.3 g. of 3,3 - ethylenedioxy-5α-androstane-1α,17β-diol, 530 mg. of p-toluene sulfonic acid, 1.06 liters of acetone and 160 cc. of water are heated under refluxing for 1 hour and permitted to stand at room temperature for an additional hour. The reaction mixture is subsequently concentrated under vacuum to about ⅓ of the original volume, it is then stirred into ice water, extracted with chloroform, the chloroform phase is washed with water until neutral, and dried over sodium sulfate. The residue which remains after evaporation under vacuum is recrystallized from ethyl acetate, and there is thus obtained 4.55 g. of 5α-androstane-1α,17β-diol-3-one which melts at 237.5–239.5° C. (with decomposition).

*Example 3*

300 mg. of lithium are dissolved in 30 cc. of water-free distilled ethylamine by stirring in a weak nitrogen stream at room temperature for 1½ hours. 1 g. of 1,2α-epoxy-5α-androstane-17β-ol-3-one-17-acetate (produced according to J. Org. Chem. 23, 929 [1958]) is then added thereto and the reaction mixture is stirred for 5 hours at −20° C. Then 0.5 g. of ammonium chloride are added and the ethylamine is distilled off under vacuum at room temperature. The remaining residue is taken up in water and extracted with methylene chloride. The methylene chloride phase is washed with water until neutral and dried over sodium sulfate. The residue which remains after evaporation under vacuum is recrystallized from methanol. There is thus obtained 23 mg. of 5α-androstane-1α,17β-diol-3-one with a melting point of 236–238° C. (with decomposition).

*Example 4*

A liquid preparation containing 5α-androstane-1α,17β-diol-3-one is made which can be administered in the form of drops, and in which 1 cc. (30–35 drops) contains 2 mg. of the active agent.

Composition for 100 cc.:
  5α-androstane-1α,17β-diol-3-one (active agent) mg__ 200
  Ethyl alcohol _____ cc__ 20
  Propylene glycol _____ cc__ 25
  Double distilled water q.s. 100 cc.

The ethyl alcohol, propylene glycol and water together acts as the solvent for the active agent. The specific gravity of the liquid at 20° C. is 0.9992.

*Example 5*

This example relates to a preparation containing 5α-androstane-1α,17β-diol-3-one as the active agent. The example relates to the preparation of gelatin capsules for oral administration, each capsule containing 25 mg. of the active ingredient.

Composition for 1 capsule: Mg.
  5α-androstane-1α,17β-diol-3-one _____ 25
  1-phenylpropanol (solvent) _____ 75
                                                 ———
                                                 100

The following procedure is used for the production of approximately 10,000 capsules:

250 g. of 5α-androstane-1α,17β-diol-3-one are dissolved by stirring into
750 g. of 1-phenylpropanol at room temperature, and the solution is then filtered.

By means of a gelatin capsule filling machine the solution is introduced into 2 minim gelatin capsules to an amount of 100 mg. per capsule. The capsule can then be hardened in the usual manner.

*Example 6*

This example relates to the production of gelatin capsules containing 5α-androstane-1α,17β-diol-3-one as the active ingredient, each capsule containing approximately 10 mg. of the active ingredient.

Composition for each capsule: Mg.
  5α-androstane-1α,17β-diol-3-one (active ingredient) _____ 10
  1-phenylpropanol (solvent) _____ 90
                                                 ———
                                                 100

The solution is introduced into 2 minim hard gelatin capsules in an amount of about 100 mg. per capsule by means of a gelatin capsule filling machine. The capsules can subsequently be further hardened in the usual manner.

*Example 7*

This example relates to the production of tablets, each tablet containing 10 mg. of 5α-androstane-1α, 17β-diol-3-one as the active ingredient.

Composition for each tablet: Mg.
  5α-androstane-1α,17β-diol-3-one (active ingredient) _____ 10.000
  Milk sugar _____ 36.000
  Corn starch _____ 66.565
  Talcum _____ 6.000
  Gelatin _____ 1.400
  p-oxybenzoic acid-methyl ester (methylparaben) _____ 0.024
  p-oxybenzoic acid-propylester (propylparaben) _____ 0.011
                                                 ————
                                                 120.000

The milk sugar, corn starch, talcum and gelatin act as fillers, and the p-oxybenzoic acid-methyl ester and p-oxybenzoic acid-propyl ester act as preservatives.

The following description relates to the production of approximately 10,000 tablets:

100 g. of 5α-androstane-1α,17β-diol-3-one,
360 g. of milk sugar and
540 g. of corn starch are granulated with
360 cc. of an aqueous solution which contains 14 g. of gelatin,
0.24 g. of p-oxybenzoic acid-methyl ester and
0.11 g. of p-oxybenzoic acid-propyl ester. After drying (15 hours at 45° C.) and passing through a sieve, the granulate is mixed with
125.65 g. of corn starch and
60.00 g. of talcum, and by means of a slightly curved 7 mm. pestle are pressed into tablets each weighing about 120 mg.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method which comprises ketalizing the 17-ester of 5α-androstane-1α,17β-diol-3-one so as to protect the keto group thereof; subjecting the thus ketalized compound to saponification in alkaline medium; and splitting the ketal ring so as to form the corresponding 5α-androstane-1α, 17β-diol-3-one.

2. The method which comprises subjecting the 17-ester of 5α-androstane-1e,17β-diol-3-one to ketalization with glycol in a non-polar, water-free organic solvent in the presence of a trace of toluene sulfonic acid; subjecting the thus ketalized compound to saponification in alkaline medium; and splitting the ketal ring so as to form the corresponding 5α-androstane-1α,17β-diol-3-one.

3. Method which comprises ketalizing the 17-ester of 5-α-androstane-1α,17β-diol-3-one so as to protect the keto group thereof; subjecting the thus ketalized compound to saponification in alkaline medium; and splitting the ketal ring under mild acid conditions so as to form the corresponding 5α-androstane-1α,17β-diol-3-one.

4. The method which comprises subjecting the 17-ester of 5α-androstane-1α,17β-diol-3-one to ketalization with glycol in a non-polar, water-free organic solvent in the presence of a trace of toluene sulfonic acid; subjecting the thus ketalized compound to saponification in alkaline medium; and splitting the ketal ring under mild acid conditions so as to form the corresponding 5α-androstane-1α,17β-diol-3-one.

5. The method which comprises protecting the 3-keto group of 1,2α-epoxy-5α-androstane-17β-ol-3-one by ketalization; subjecting the thus formed compound to reductive splitting by means of lithium-aluminum hydride so as to form the corresponding 3,3-ethylenedioxy-5α-androstane-1α,17β-diol; and splitting the ketal ring so as to form the corresponding 5α-androstane-1α,17β-diol-3-one.

6. The method which comprises reductively splitting 1,2α-epoxy-5α-androstane-17β-ol-3-one with lithium dissolved in ethylamine so as to form the corresponding 5α-androstane-1α,17β-diol-3-one.

References Cited by the Examiner
UNITED STATES PATENTS

| | | | |
|---|---|---|---|
| 2,968,595 | 1/1961 | Greenspan et al. | 195—51 |
| 3,118,916 | 1/1964 | Goedicke | 260—397.4 |

OTHER REFERENCES

Dodson et al.: J. Org. Chem., vol. 27, pages 3159–64, September 1962.

LEWIS GOTTS, *Primary Examiner.*

HENRY A. FRENCH, *Assistant Examiner.*